Figure 1:
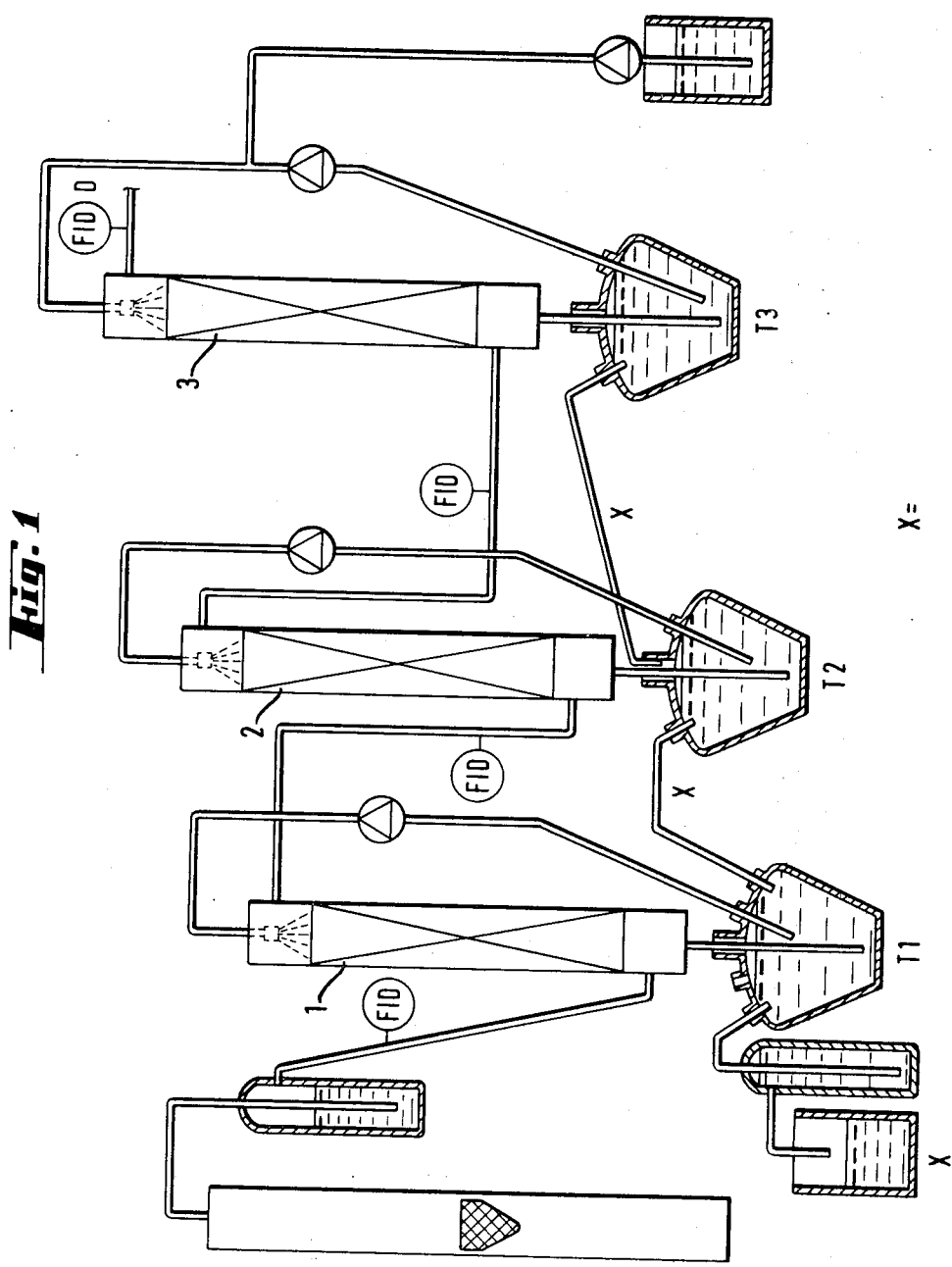

United States Patent [19]

Bentz et al.

[11] 4,441,896

[45] Apr. 10, 1984

[54] PROCESS FOR RECOVERING ORGANIC SUBSTANCES FROM SPENT AIR VAPORS

[75] Inventors: Rolf Bentz, Basel; Christian Schori, Muttenz, both of Switzerland

[73] Assignee: Ciba-Geigy Corporation, Ardsley, N.Y.

[21] Appl. No.: 417,234

[22] Filed: Sep. 13, 1982

[30] Foreign Application Priority Data

Sep. 18, 1981 [CH] Switzerland ............... 6044/81

[51] Int. Cl.$^3$ ............................................. B01D 47/06
[52] U.S. Cl. ............................................ 55/85; 55/48; 208/333
[58] Field of Search ............... 55/48, 84, 85; 208/333; 585/834, 835, 864

[56] References Cited

U.S. PATENT DOCUMENTS

| | | |
|---|---|---|
| 1,220,651 | 3/1917 | Linderborg et al. ............ 55/48 |
| 2,414,252 | 1/1947 | Ashburn ........................ 585/864 |
| 2,727,848 | 12/1955 | Georgian ....................... 585/864 |
| 3,739,548 | 6/1973 | Hegwer ......................... 55/48 |
| 3,867,112 | 2/1975 | Honerkamp et al. ............ 55/84 |
| 4,225,415 | 9/1980 | Mirza et al. ................... 55/48 |
| 4,263,019 | 4/1981 | Minkkinen ..................... 55/48 |
| 4,299,668 | 11/1981 | Berg ........................... 585/864 |
| 4,318,716 | 3/1982 | Doerges et al. ................ 55/48 |

FOREIGN PATENT DOCUMENTS 913731 12/1962 United Kingdom ............... 208/333

Primary Examiner—David L. Lacey
Attorney, Agent, or Firm—Harry Falber

[57] ABSTRACT

The invention relates to a process for recovering preferably water-insoluble organic substances such as nitrobenzene, dichlorobenzene and/or trichlorobenzene by absorption from spent air vapors which contain these substances. The process comprises passing the spent air vapors through a high-boiling organic liquid, preferably polyethylene glycol, subsequently adding water to the saturated absorbent and separating the recovered organic substance from the absorbent/water mixture after phase separation.

6 Claims, 3 Drawing Figures

PROCESS FOR RECOVERING ORGANIC SUBSTANCES FROM SPENT AIR VAPORS

The present invention relates to a process for recovering organic substances, in particular nitrobenzene, dichlorobenzene and trichlorobenzene, from spent air vapours.

Industrial waste gases and spent air vapours from airconditioning plants in chemical or medical laboratories, or also in dry cleaning establishments, frequently contain more or less large amounts of organic solvent vapours. The uncontrolled release of these vapours into the atmosphere gives rise, on the one hand, to serious ecological problems, and, on the other, the possible loss of large amounts of solvent is a matter of economic importance. It is therefore increasingly necessary to retain the solvent vapours contained in the exhaust air and to recycle them.

In known methods, the exhaust air is usually passed over a solid absorbent which, in the prior art processes, consisted almost exclusively of activated carbon. Reference is made in this connexion to German Offenloegungsschrift Nos. 2 735 568 and 2 901 894. In spite of the wide use of activated carbon, it also has a number of disadvantages. On the one hand, plant safety is not guaranteed if the activated carbon is saturated with organic solvents (which often have a very low flash point). On the other hand, the ratio of maximum saturation of the activated carbon to the residual amount of solvent after regeneration of the absorbent is not ideal.

European patent application No. 30 291 discloses a process for recovering nitrobenzene, dichlorobenzene and/or trichlorobenzene from spent air vapours by absorption on a silica gel-containing material with subsequent regeneration of the absorbent by removing the sorbed compounds, in which process the ratio of maximum saturation of the absorbent to the residual amount of solvent after regeneration is better then in absorption on activated carbon.

There has now been found a process for recovering organic substances, in particular nitrobenzene, dichlorobenzene and trichlorobenzene, from spent air vapours, which process is superior in effectiveness to the aforementioned processes for recovery by absorption.

The process of this invention comprises passing spent air vapours which contain organic substances through a liquid having a high boiling point and which is homogeneously miscible with water, subsequently adding water to the absorbent and separating the recovered organic substance from the mixture of absorbent and water after phase separation.

The recovered organic substance, hereinafter generally referred to as pollutant, is obtained after phase separation and can be recovered in virtually pure form. Before re-use, the water is either distilled off from the absorbent/water mixture or removed by heating, preferably to 70°–120° C., and stripping with air saturated with pollutant, and subsequently condensed by cooling te air/vapour mixture.

The organic substances to be recovered are preferably water-insoluble compounds. Compounds which are readily recoverable are 1,2-dichlorobenzene, 1,2,4-trichlorobenzene and, in particular, nitrobenzene, and the preferred high-boiling organic liquid is polyethylene glycol. Further compounds which are recoverable are e.g. acrylonitrile, epichlorohydrin, methylene chloride, perchloroethylene, chlorobenzene and toluene, which compounds, however, have a lower saturation concentration in the high-boiling organic liquid, especially in polyethylene glycol, than the water-insoluble substances mentioned as being preferred. In addition to the preferred polyethylene glycol, other polyhydric alcohols, e.g. glycol, ethylene glycol, propylene glycol and glycerol, or also paraffin and silicone oils, are suitable absorbents for the process of this invention; however, the substances to be recovered are less readily soluble in these absorbents.

The process of this invention may be carried out in any apparatus technically employed or known from the literature which contains means in which a gas can be passed through a liquid absorbent, including e.g. a wash column which contains the absorbent and through which the gas mixture is passed until saturation is reached. A number of wash columns connected in series may be also employed, with the absorbent being circulated in each column and the overflow being effected from column to column via the sump. A further possibility of carrying out the process consists in absorption by the countercurrent principle in a multiple column. The above methods are described in the following Examples as laboratory experiments which at the same time serve to determine the saturation concentration of a number of pollutants in the absorbents, in particular in polyethylene glycol.

EXAMPLE 1

Saturation in the wash bottle

The desired pollutant concentration in the air is achieved by mixing a stream of air which is saturated by passing it through the appropriate solvent, with ambient air. The volumes of both streams of gas are adjusted by means of a rotameter and the total volume is 300 l per hour. The mixture of gases flows over a frit into a thermostatically controlled wash bottle which is filled with the absorbent. To determine the saturation point, the exiting gas is controlled with a hydrocarbon analyser (FID). The experiment is discontinued as soon as the concentration of the gas on entry is the same as that on exiting. As the humidity can also be absorbed, the laboratory air must be dried in this method with silica gel containing moisture indicator. The concentration of the organic pollutant in the absorbent is determined by gas chromatography.

| Solvent | Absorbent | Concentration of gas on entry [mg/m³] | Temp. [°C.] | Saturation concentration [%] |
|---|---|---|---|---|
| acrylonitrile | PEG 400 | 500 | 22 | 0.045 |
| acrylonitrile | PPG 1200 | 500 | 22 | 0.1 |
| acrylonitrile | paraffin oil | 500 | 22 | 0.1 |
| acrylonitrile | ethylene glycol | 500 | 22 | 0.1 |
| epichlorohydrin | PEG 400 | 220 | 22 | 0.1 |
| epichlorohydrin | paraffin oil | 220 | 22 | 0.1 |
| methylene chloride | PEG 400 | 6700 | 22 | 0.17 |
| methylene chloride | glycol | 6300 | 21 | 0.019 |
| methylene chloride | glycerol | 6300 | 25 | 0.09 |
| methylene chloride | silicone oil Bayer PD5 | 6300 | 25 | 0.034 |
| methylene chloride | silicone oil Bayer M300 | 6300 | 25 | 0.022 |
| perchloroethylene | PEG 400 | 2800 | 22 | 0.32 |
| chlorobenzene | PEG 400 | 3300 | 22 | 1.2 |
| o-dichlorobenzene | PEG 400 | 2800 | 22 | 9.7 |

-continued

| Solvent | Absorbent | Concentration of gas on entry [mg/m³] | Temp. [°C.] | Saturation concentration [%] |
|---|---|---|---|---|
| 1,2,4-trichlorobenzene | PEG 400 | 1900 | 22 | 26.6 |
|  | PEG 400 | 1900 | 43 | 10.3 |
| "PEG 400 |  | 1900 | 48 | 7.5 |
| " | PEG 400 | 1900 | 60 | 3.8 |
| "PEG 400 |  | 4000 | 22 | 0.31 |

PEG = polyethylene glycol
PPG = polypropylene glycol

EXAMPLE 2

Absorption in wash columns connected in series
(FIG. 1)
Three glass columns having the following measurements are used:

| diameter | 40 mm |
|---|---|
| height | 500 mm |
| filling height | 400 mm |
| diameter of the Raschig rings | 10 mm |

Compressed air (660 l/h) saturated with the pollutant is passed at room temperature through the 3 wash columns which are connected in series. The absorption solution is circulated in each column. The overflow from column to column is effected via the sump. Depending on the experiment, fresh or regenerated polyethylene glycol Carbowax PEG 400 is fed continuously to columns 1, 2 or 3. The experiments last until the same values can be read off repeatedly at all gas analysis positions over 48 hours. The concentration of the nitrobenzene in the polyethylene glycol is determined by titanometry and that of 1,2-dichlorobenzene and 1,2,4-trichlorobenzene by gas chromatography. The water content of the absorption solution is determined by the Karl Fischer method.

(a) Nitrobenzene

| amount of gas | 660 l/h |
|---|---|
| sojourn time in each column | 2.7 sec. |
| irrigation: |  |
| experiment 1,2–8 4.5 l/m³ of gas |  |
| experiment 2,9 0.2 l/m³ of gas |  |
| temperature | 20°–25° C. | a portion of this nitrobenzene is stripped off in column T3. The nitrobenzene concentration in the absorbent is lower in the sump than at the top of column T3, and in the gas it is higher at the exit of T3 than at the entry of T3.

(b) o-Dichlorobenzene (o-DCB)

| amount of gas | 660 l/h |
|---|---|
| sojourn time per column | 2.7 sec. |
| irrigation: T1, T2 | 0.2 l/m³ |
| T3 for addition of pure PEG |  |
| temperature | 20°–25° C. |

| Experiment | Addition of PEG in T3 [ml/h] | Conc. of o-DCB in mg/m³ | | | | Conc. of o-DCB in PEG at exit of T1 in [%] |
|---|---|---|---|---|---|---|
|  |  | T1 entry | T2 entry | T3 entry | T3 exit |  |
| 1 | 107 | 1800 | 1500 | 250 | 27 | 1.29/1.41 |

(c) 1,2,4-Trichlorobenzene (TCB)

| amount of gas | 660 l/h |
|---|---|
| sojourn time in each column | 2.7 sec. |
| irrigation: T1, T2 | 0.2 l/m³ |
| T3 for addition of pure PEG |  |
| temperature | 20°–25° C. |

| Experiment | Addition of PEG in T3 [ml/h] | Conc. of TCB in (mg/m³) | | | | Conc. of TCB in PEG at exit of T1 in [%] |
|---|---|---|---|---|---|---|
|  |  | entry | entry | entry | exit |  |
| 1 | 29 | 2000 | 1200 | 220 | 28 | 4.1/3.8 |
| 2 | 23 | 2000 | 1350 | 540 | 88 | 5.2 |

EXAMPLE 3

Figure 2:
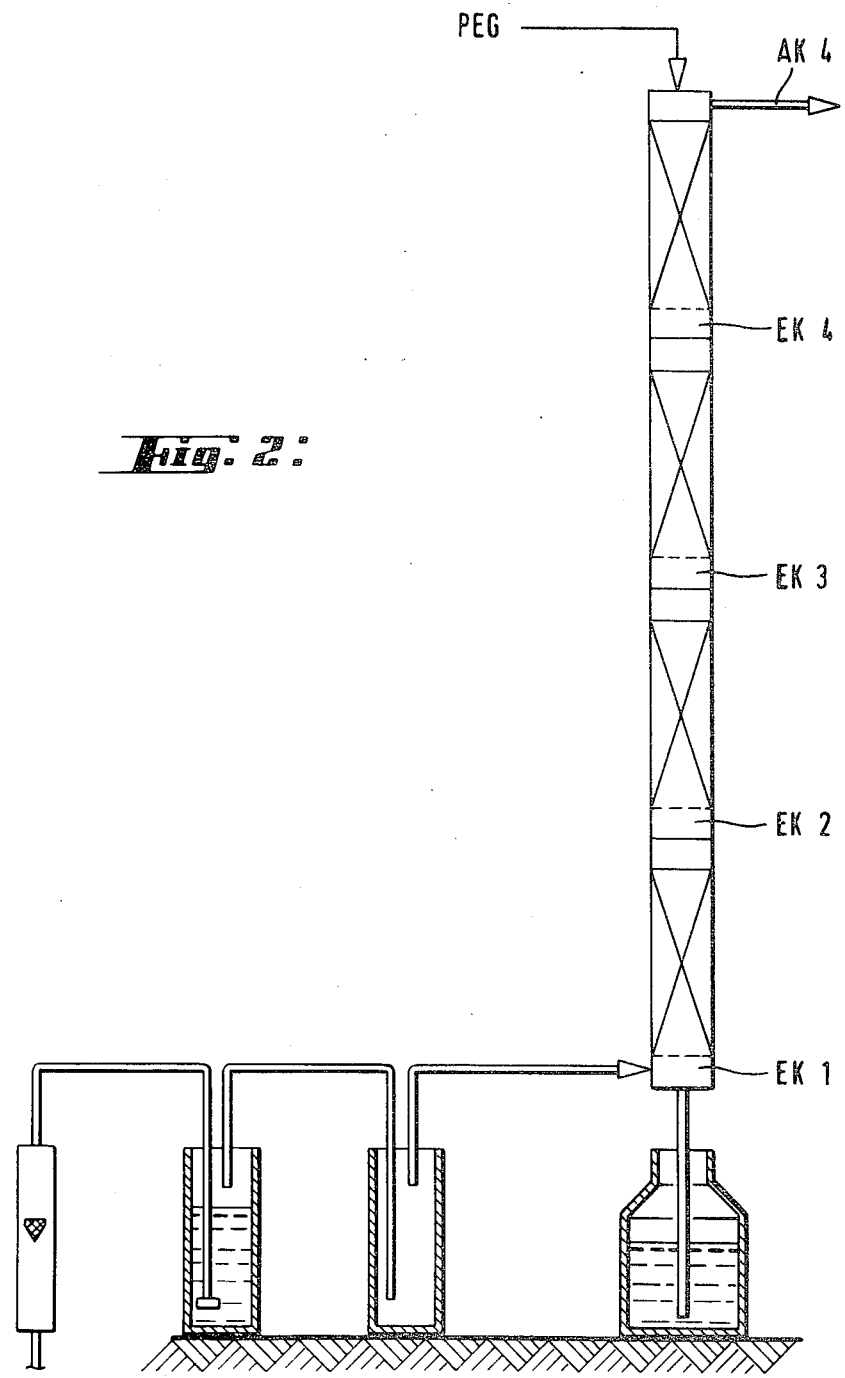

Absorption in a column without circulation of the absorbent (FIG. 2)
The column consists of 4 sections of the following dimensions:

| diameter | 40 mm |
|---|---|
| height | 500 mm |
| filling height | 400 mm |
| diameter of the Raschig rings | 8 mm |

| Experiment | Addition of pure Regenerated PEG | | | | | | Concentration of NB in [mg/m3] | | | | Composition of absorption solution in [%] | | | | | |
|---|---|---|---|---|---|---|---|---|---|---|---|---|---|---|---|---|
|  | PEG in T3 [ml/h] | composition in % | | | [ml/h] | column | T1 entry | T2 entry | T3 entry | T3 exit | T1 | | T2 | | T3 | |
|  |  | PEG | NB | H₂O |  |  |  |  |  |  | NB | H₂O | NB | H₂O | NB | H₂O |
| 1 | 3.0 | — | — | — | — | — | 2000 | 850 | 380 | 150 | 18.3 | 3.1 | 7.0 | 3.0 | 2.7 | 3.1 |
| 2 | 9.4 | — | — | — | — | — | 2000 | 480 | 83 | 4.4 | — | — | — | — | — | — |
| 3 | — | 72 | — | 28 | 8.8 | 3 | 2000 | 510 | 174 | 39 | 11.2 | 3.1 | — | — | — | — |
| 4 | — | 72 | — | 28 | 12.7 | 3 | 2000 | 500 | 130 | 15 | — | — | — | — | — | — |
| 5 | — | 37.6 | 0.6 | 61.8 | 10.5 | 3 | 2000 | 726 | 305 | 308 | 15.2 | 3.4 | 4.7 | 7.4 | 0.35 | 37 |
| 6 | — | 37.6 | 0.6 | 61.8 | 14.6 | 3 | 2000 | 580 | 275 | 341 | 9.1 | 5.0 | 4.1 | 8.5 | 0.4 | 37 |
| 7 | — | 57.6 | 2.4 | 40 | 10.0 | 3 | 2000 | 667 | 262 | 176 | 10.7 | 3.0 | 4.7 | 3.9 | 2.5 | 9.0 |
| 8 | 3.0 | 57.6 | 2.4 | 40 | 8.0 | 1 | 2000 | 553 | 377 | 132 | 11.0 | 9.7 | 7.1 | 8.8 | 2.3 | 7.4 |
| 9 | 3.8 | 45 | 1.0 | 54 | 11.7 | 2 | 2000 | 429 | 330 | 140 |  |  |  |  |  |  |

PEG = polyethylene glycol Carbowax PEG 400
NB = nitrobenzene

In experiments 5–9, the regenerated absorption solution still contains some nitrobenzene. In experiments 5 and 6, Air saturated with nitrobenzene is drawn through the column by applying a low partial vacuum. In countercurrent, polyethylene glycol Carbowax PEG 400 is added continuously or in portions at the head of the column. After each section of the column the concentration of nitrobenzene can be determined in the stream of gas with a hydrocarbon analyser (FID):

| amount of gas | 660 l/h |
|---|---|
| sojourn time per section | 2.7 sec. |
| entire column | 10.8 sec |
| temperature | 20°–25° C. |

EXAMPLE 4

Regeneration of the absorbent

Addition of water to the polyethylene glycol solution saturated with nitrobenzene results in phase separation, with nitrobenzene of very high purity forming the lower phase and a solution of absorbent/water forming the upper phase. After phase separation, the water is distilled off from the absorbent. A complicated separation of the nitrobenzene from the absorbent can be avoided in this manner. The same method is also used for regenerating polyethylene glycol which is saturated with o-dichlorobenzene and 1,2,4-trichlorobenzene.

Solution: 1 part of nitrobenzene + 4 parts of Carbowax PEG 400
Distillation of the upper phase in a rotary evaporator at 60° C. and 10 mm Hg over 10 minutes.

| Experiment | Solution [g] | H₂O [g] | H₂O/nitro-benzene | lower phase [g] | Rotary evaporator residue | Distillate g H₂O | nitrobenzene g | Analysis dissolved nitrobenzene in % lower phase | residue | H₂O |
|---|---|---|---|---|---|---|---|---|---|---|
| 1 | 50 | 10 | 1 | — | — | — | — | — | — | — |
| 2 | 50 | 25 | 2.5 | 8.4 | 40.3 | 24.3 | ? | 94.3 | 3.06 | 0.98 |
| 3 | 50 | 50 | 5 | 8.4 | 38.9 | 46.3 | ? | 98.9 | 0.31 | 0.18 |
| 4 | 50 | 100 | 8.4 | 41.7 | 74.3 | ? | 99.3 | 0.03 | 0.29 | |
| 5 | 100 | 20 | 1 | — | — | — | — | — | — | — |
| 6 | 100 | 40 | 2 | 13.7 | 80.7 | 40.4 | 1.0 | 87.4 | 5.60 | 0.21 |
| 7 | 100 | 60 | 3 | 16.7 | 79.8 | 44.6 | 1.2 | 97.3 | 1.52 | 0.64 |
| 8 | 100 | 90 | 4.5 | 18.0 | 79.8 | 55.0 | 1.8 | 98.1 | 0.42 | 0.19 |

In experiments 1, 3 and 4, the addition of polyethylene glycol is made continuously. In experiment 2, 14.4 ml of polyethylene glycol is added to the column batchwise every 3 hours.

| Experiment | Addition of PEG [ml/h] | Conc. of NB in (mg/m³) EK1 | EK2 | EK3 | EK4 | AK4 | Conc. of NB in PEG at AK1 [%] |
|---|---|---|---|---|---|---|---|
| 1 | 4.7 | 2000 | 530 | 308 | 176 | 110 | 21.0 |
| 2 | 14.4/3h | 2000 | 750 | 506 | 308 | 187 | 20.0 |
| 3 | 7.6 | 2000 | 540 | 231 | 154 | 60 | 14.8 |
| 4 | 9.0 | 2000 | 500 | 140 | 85 | 22 | 12.8 |

Solution: 1 part of o-dichlorobenzene + 9 parts of polyethylene glycol.
Distillation of the aqueous upper phase in a rotary evaporator at 60° C./10 mm Hg over 30 minutes.

| Exp. | Sol. [g] | H₂O [g] | Ratio of H₂O/o-DCB | Rotary Evaporator residue [g] | distillate H₂O (g) | g o-DCB | Lower phase [g] | o-DCB (%) | H₂O (%) |
|---|---|---|---|---|---|---|---|---|---|
| 1 | 100 | 25 | 2.5 | — | — | — | — | — | — |
| 2 | 100 | 50 | 5 | 89.9 | 38.9 | 1.6 | 7.1 | 96 | 0.3 |
| 3 | 100 | 75 | 7.5 | 89.9 | 70.6 | 0.6 | 8.8 | 98 | 0.5 |
| 4 | 100 | 100 | 10 | 90.1 | 96.1 | 0.1 | 9.2 | 98 | 0.2 |
| 5 | 100 | 150 | 15 | 91.4 | 134.9 | 0 | 9.6 | 98 | 0.2 |
| 6 | 100 | 200 | 20 | 91.1 | 192.6 | 0 | 9.4 | 98 | 0.4 |

Solution: 15 parts of 1,2,4-trichlorobenzene + 85 parts of polyethylene glycol.
Distillation of the aqueous upper phase in a rotary evaporator at 60° C./10 mm Hg over 30 minutes.

| Exp. | Sol. [g] | H₂O [g] | Ratio of H₂O/TCB | Rotary evaporator residue [g] | distillate H₂O (g) | TCB (g) | Lower phase [g] | TCB* (%) | H₂O (%) |
|---|---|---|---|---|---|---|---|---|---|
| 1 | 100 | 25 | 1.67 | 86.5 | 20.3 | 0.9 | 10.6 | 93.5 | 1.2 |
| 2 | 100 | 50 | 3.33 | 85.0 | 44.6 | 0.5 | 13.9 | 95.7 | 1.5 |
| 3 | 100 | 75 | 5 | 85.4 | 71.0 | 0.4 | 14.3 | 95.2 | 1.5 |
| 4 | 100 | 100 | 6.67 | 86.7 | 92.1 | 0.3 | 14.5 | 95 | 2.9 |
| 5 | 100 | 150 | 10 | 85.2 | 141.0 | 0.2 | 14.9 | 95 | 1.3 |
| 6 | 100 | 200 | 13.3 | 84.4 | 188.3 | 0.1 | 14.8 | 97 | 1.6 |

*The trichlorobenzene (TCB) employed has a purity of 97%.

Figure 3:
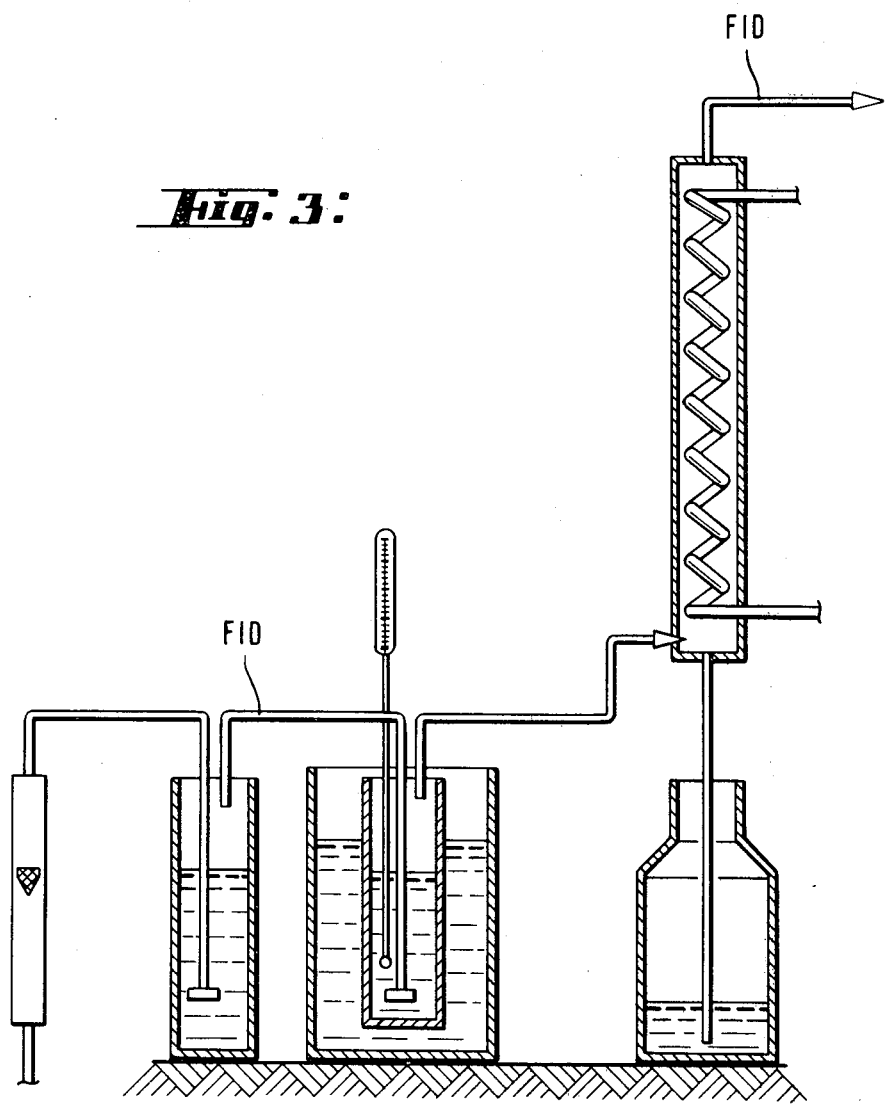

Stripping of the aqueous absorbent/wate mixture
(FIG. 3)

| Amount of absorption solution to which water is added after phase separation: | 185 g |
|---|---|
| amount of gas: | |
| experiment 1 | 300 l/h |

-continued

| | |
|---|---|
| experiment 2 + 3 | 150 l/h |
| duration of experiment | 2 h |

| Experiment | Conc. of TCB in the gas [mg/m$^3$] | Temp. of the solution [°C.] | Composition of the solution initially in % | | | Composition of the solution at the conclusion in % | | |
|---|---|---|---|---|---|---|---|---|
| | | | PEG | TCB | H$_2$O | PEG | TCB | H$_2$O |
| 1 | — | 75 | 52.8 | 0.46 | 46.7 | 93.5 | 0.47 | 6.0 |
| 2 | 1900 | 108 | 53.2 | — | 46.8 | 99.5 | 0.47 | 0 |
| 3 | 1900 | 108 | 52.8 | 0.46 | 46.7 | 99.6 | 0.40 | 0 |

What is claimed is:

1. A process for recovering nitrobenzene, dichlorobenzene or trichlorobenzene from spent air vapours by absorption, which process comprises passing spent air vapours containing these organic substances through an organic liquid which has a high boiling point and is homogeneously miscible with water, absorbing said organic substances therein, subsequently adding water to the absorbent organic liquid, forming a lower phase of organic substance and an upper phase of absorbent/water solution and separating and recovering the organic substances from the absorbent/water mixture.

2. A process according to claim 1, wherein said organic liquid is polyethylene glycol.

3. A process according to claim 1, wherein said absorbing step comprises passing the spent air vapours which contain the organic substances through one or more gas washing columns which are irrigated with said high-boiling organic liquid.

4. A process according to claim 1, wherein the water is distilled off from the absorbent/water mixture after recovery of the organic substances.

5. A process according to claim 1, wherein the water is removed from the absorbent/water mixture, after recovery of the organic substances, by heating said mixture, stripping with air saturated with said organic substances and subsequently condensing the water by cooling the air/vapour mixture.

6. A process according to claim 7, wherein said absorbent/water mixture is heated to 70°-120° C.

* * * * *